United States Patent [19]

Rode

[11] Patent Number: 4,611,935
[45] Date of Patent: Sep. 16, 1986

[54] ADJUSTABLE SHAFT SUPPORT ARRANGEMENT

[75] Inventor: John E. Rode, Albany, N.Y.

[73] Assignee: Temper-Ring Equipment Corporation, Fonda, N.Y.

[21] Appl. No.: 683,875

[22] Filed: Dec. 20, 1984

Related U.S. Application Data

[62] Division of Ser. No. 407,992, Aug. 13, 1982, Pat. No. 4,492,018.

[51] Int. Cl.$^4$ .......................... F16C 19/24; F16C 23/06
[52] U.S. Cl. ........................................ 384/548; 384/563
[58] Field of Search ............... 384/514, 517, 518, 519, 384/537, 548, 556, 559, 563, 571, 583, 585, 593, 620; 29/437, 445, 454

[56] References Cited

U.S. PATENT DOCUMENTS

| 2,911,855 | 11/1959 | Opocensky | 384/537 X |
| 3,476,454 | 11/1969 | Markey | 384/581 X |
| 3,600,048 | 8/1971 | Makhobey | 384/537 X |
| 3,900,232 | 8/1975 | Rode | 384/542 |
| 3,934,957 | 1/1976 | Derner | 384/563 |
| 4,125,929 | 11/1978 | Rode | 29/446 |
| 4,214,465 | 7/1980 | Rode | 100/257 X |

FOREIGN PATENT DOCUMENTS

| 196320 | 11/1983 | Japan | 384/517 |
| 207523 | 12/1983 | Japan | 384/517 |

Primary Examiner—Stuart S. Levy
Assistant Examiner—Thomas R. Hannon
Attorney, Agent, or Firm—Roger M. Rickert

[57] ABSTRACT

A scheme for accurately and quickly axially positioning a rotatable member such as the axles of a differential or a shaft supported impeller of a centrifugal pump within a housing or similar support for rotation therein with predetermined axial bearing clearance which is independent of the dimensional variations of the member and support is disclosed wherein a deformable spacing element is associated with each thrust carrying bearing with the adjacent bearing and spacing element being held axially captive between the shaft and a corresponding disc which is slidable relative to the housing and with one disc axially aligned and limited in sliding movement in one common direction opposite the direction from which the rotatable member is positioned by engagement with the housing. Typically there are two discs, one limited in movement toward the interior of the housing and the other limited in movement by the housing. The deformation of the spacing elements is then accomplished by a series of displacements of the discs and shaft relative to the housing.

8 Claims, 5 Drawing Figures

ADJUSTABLE SHAFT SUPPORT ARRANGEMENT

This is a division of application Ser. No. 407,992, filed Aug. 13, 1982 and now U.S. Pat. No. 4,492,018.

BACKGROUND OF THE INVENTION

The present invention relates generally to rotatable shaft journalling arrangements and more particularly to a method and apparatus for accurately positioning a rotatable member within a housing.

The assembly of workpieces, such as machinery having rotating parts, frequently requires the precise fitting of antifriction rolling elements such as ball or roller bearings. Tolerances of the manufactured workpiece parts may cause variations in the axial dimensions of the workpiece which may exceed allowable variations for the fitting of bearings therein and therefore often some method of selective fitting or tailoring of a compensating component is required. One method commonly employed is to measure the assembly of components and provide a shim or spacer selected to precisely obtain the desired fit, which may be either a small amount of free end play or clearance, or some prescribed value of a preloading force on the assembly.

In some cases the axial location of the rotating part may be particularly important. For example, in a typical differential axle there is a critical dimension requiring the accurate axial positioning of the differential gear assembly so that the ring gear and pinion gear are in proper close fitting engagement (correct backlash) and the supporting bearings such as tapered roller bearings are in correct axial position for optimum running life. The conventional technique for making such assemblies is a trial and error measuring and fitting of the component parts in order to allow for the customary dimensional tolerances of manufacture of the parts in an economical manner. This selective fitting is usually accomplished by use of thin metal shims which are added or removed after each trial assembly until the correct gear mesh and bearing fit are achieved. Thus, such a trial and error fitting process is, of course, quite time consuming and contributes materially to the overall cost of such a differential axle. This same problem is, of course, present in numerous other rotating devices involving some critical interior dimension on the device rotating member relative to its containing housing.

An early example of an arrangement for preloading ball bearing arrangements in a workpiece is illustrated by U.S. Pat. No. 2,101,130 to Christman. The Christman arrangement provides a deformable or crushable separator element between ball bearing races so that in the assembly of the parts, this separator may compensate for inaccuracies of the workpiece parts. Christman employs a press to deform his spacing element to a preferred load, whereupon the workpiece parts are crimped or otherwise permanently fastened in position. In other words, Christman relatively moves his workpiece parts until a certain preload force is achieved, whereupon the parts are permanently affixed to complete the workpiece.

Another early example of an arrangement for accurately positioning ball bearings having as a stated goal the elimination of trial and error shim removing or inserting techniques of the type discussed above is U.S. Pat. No. 2,911,855 to Opocensky. In this patented device the positioning of the bearing supporting opposed bevel gears in a differential gear assembly is accomplished by employing a deformable non-resilient spacer, positioning the gear to have the appropriate amount of backlash and then fastening the gear in that position. The Opocensky approach is quite limited in the range of classes of mechanisms to which it may be applied and is not, to my knowledge, in widespread commercial use.

In contradistinction improved spacers such as described in my U.S. Pat. Nos. 3,595,588; 3,774,896; 3,900,232; 4,067,585; 4,125,929 and 4,214,465 and in conjunction with the arrangement and method of U.S. Pat. Nos. 3,726,576 and 3,672,019, have met with widespread commercial success. Briefly, my improved annular spacing elements are designed to experience elastic deformation with a relatively linear stress-strain relationship followed by plastic deformation under a relatively constant load or force and when the originally applied deforming force is removed, they again exhibit a relatively linear stress-strain relationship displaced by the amount of plastic deformation from their original stress-strain relationship. Thus attempting to apply the Christman techniques to my spacers would result in either no deformation or a complete crushing. Similarly, attempting to apply the Opecensky techniques to my spacers would result in the bevel gear bearings being subjected to a permanent stress.

As perhaps best illustrated by the aforementioned U.S. Pat. No. 4,214,465 the use of my spacers has until now been generally limited to the use of a single spacer to compensate for dimensional variations of the shaft journals with all of that compensation occuring at one location therefore limiting the use of my spacers to situations where there were no highly critical interior dimensions involved. The first use of the aforementioned U.S. Pat. No. 4,214,465 applied to the establishment of a critical interior dimension as well as the adjustment of the shaft journals was in worm gear speed reducers where the critical dimension of the shaft location can be approached from either direction and the shaft may be moved past the desired location by a small amount and returned to that location provided that the amount of the additional movement equals or is less than the elastic strain of the spacer and bearings. It would be highly desirable to expand the class of machines to which my spacers may be applied to include those having critical interior clearance requirements that can only be approached from one direction. It will become apparent that the present invention may also be used for devices such as worm gear speed reducers and offers the further advantage that the required parts may be simpler and less costly to manufacture. It would be highly desirable to expand the class of machines to which my spacers may be applied to include those having critical interior clearance requirements.

SUMMARY OF THE INVENTION

Among the several objects of the present invention may be noted the provision of a method and apparatus for accurately forming an axially compressible spacer in a journalled device to a predetermined device axial bearing clearance and an accurate positioning of the rotatable member of the device independent of device dimensional variations; the provision of an arrangement for protecting a first deformed spacer from further deformation while deforming a second such spacer to eliminate the trial and error shim setting in certain thrust-carrying bearing installations; the provision of an accurately positioned axially journalled rotating member; the provision of a scheme for quickly and easily presetting axial loading or operating clearance of bearings in a rotating device; and the provision of a generally improved rotating member device. These as well as other objects and advantageous features of the present invention will be in part apparent and in part pointed out hereinafter.

In general, a rotatable member is correctly axially positioned relative to a support with this positioning compressing a first deformable spacer to its desired final axial dimension. Thereafter, an additional predetermined axial compression is imparted to the first spacer to relieve the stress therein. A second deformable spacer is then compressed to its desired final axial dimension and an additional predetermined axial compression is imparted thereto to relieve the stress in the second spacer. Further deformation of the first spacer is prevented while the second is being deformed.

Also in general and in one form of the invention, an arrangement of thrust carrying bearings and deformable spacing elements rotatably supporting a shaft within a housing is disclosed employing axially aligned discs or sleeves which are slidable in the housing and limited in their sliding movement such that a first disc or sleeve is captive from moving away from the interior of the housing and not limited from moving toward the interior of the housing and the other disc or sleeve is captivated from moving away from the housing interior after the dimensions of the deformable spacers are imposed on said spacers. Each bearing is adjacent a corresponding spacing element with the spacing element and adjacent bearing being axially captive between a respective disc or sleeve and the shaft. The housing may include a critical dimension determining element such as a mating gear or housing surface and the shaft may include a portion such as a ring gear or impeller which cannot be moved in the direction towards the first disc or sleeve beyond the critical dimension determining housing portion.

BRIEF DESCRIPTION OF THE DRAWINGS

Corresponding reference characters indicate corresponding parts throughout the several views of the drawings.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
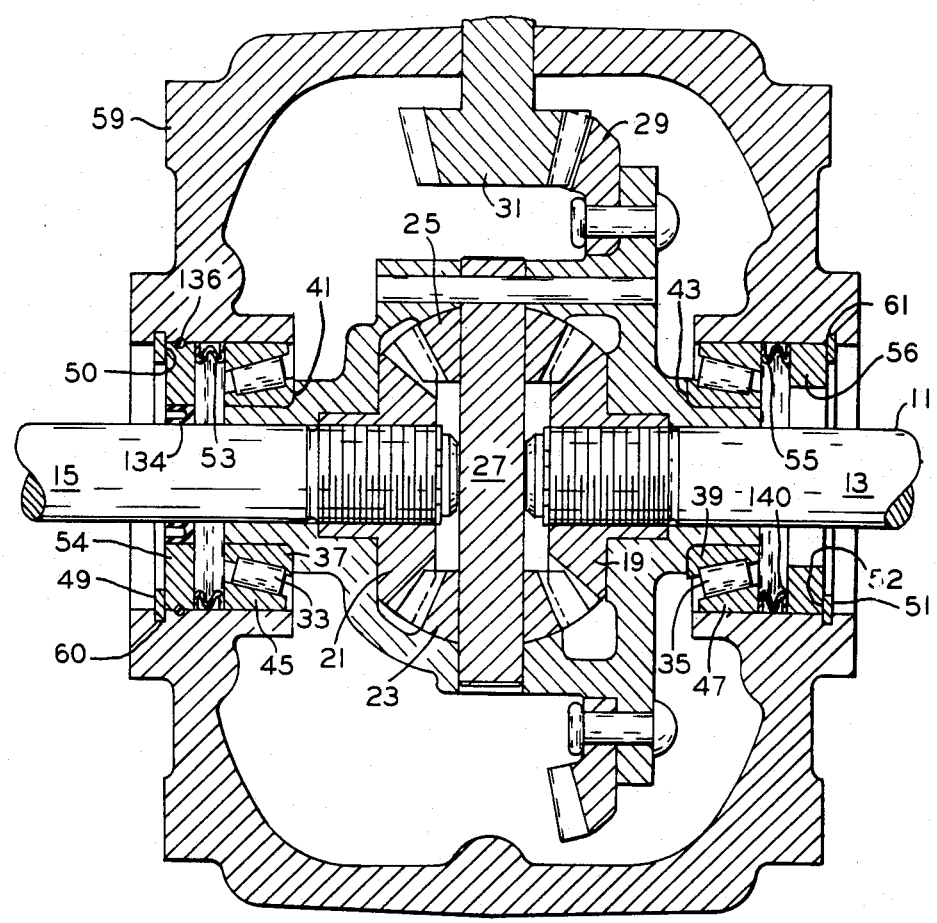
FIG. 1 is a view in cross section of a typical differential axle assembled according to the techniques of the present invention.

Referring first to the differential axle illustrated in FIG. 1, the shaft or axle 11 is illustrated as having independent shaft portions 13 and 15 joined by a differential gear assembly including the shaft mounted bevel gears 19 and 21 and a pair of meshing bevel gears 23 and 25 rotatable about shaft 27 and with shaft 27 being fixed to an annular ring gear 29 which in turn engages a drive pinion gear 31. Shaft 11 is journalled for rotation in the tapered roller bearings 33 and 35 having inner race portions 37 and 39 with those inner race portions being limited in their axially inward movement, respectively, by the radially outwardly protruding shaft portions 41 and 43. The bearings also include outer races 45 and 47 which are respectively limited in their axially outward movement by the radially inwardly protruding retaining rings 49 and 51 engaged in housing grooves 60 and 61. Deformable spacers 53 and 55 of the type disclosed in my aforementioned patents abut one of the bearing races and are in turn abutted by one of the slidable discs 54 and 56 so that the bearing, spacer and disc are axially captive between a retaining shoulder and the shaft.

Figure 4:
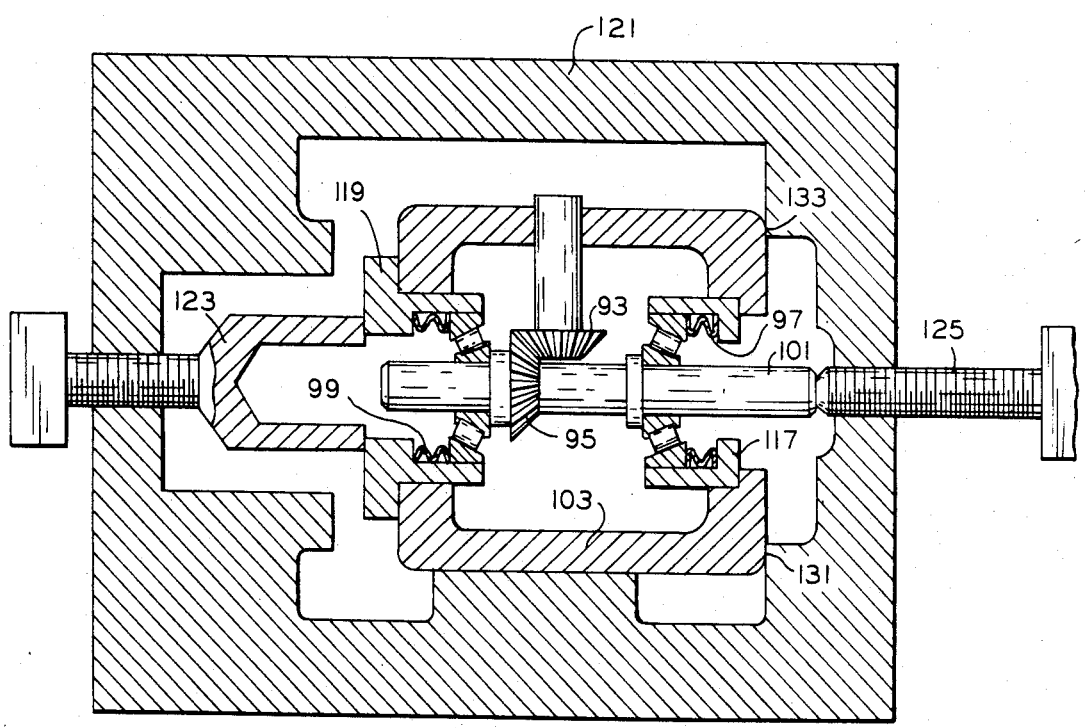
FIG. 4 is a view of the device and machine of FIG. 3 illustrating completion of the deformation of the spacing elements.
Figure 5:
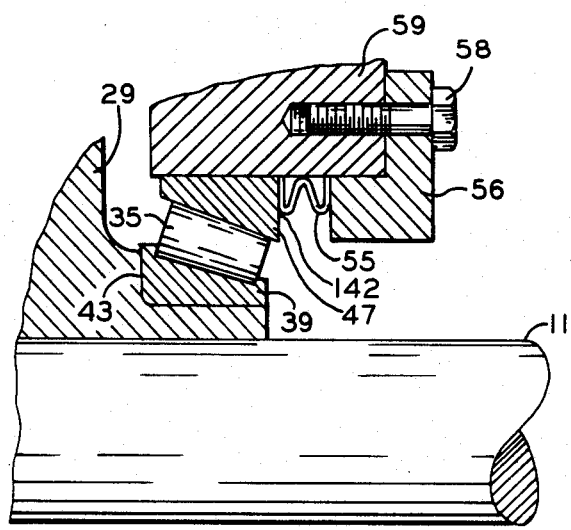
FIG. 5 is a portion of the view of FIG. 1 illustrating a variation of the arrangement for retaining the bearing according to the present invention.

In the differential axle illustrated in FIG. 1, movement of the shaft 11 toward the left as viewed along its axis is limited by engagement between the ring gear 29 and journalled pinion gear 31 and the relative positioning of these two gears with the desired amount of backlash is a critical internal dimension for such a differential axle. Disc 54 is slidable in the housing 59 and limited in that sliding movement toward the left as viewed by the shoulder 50 created by the retaining ring 49 engaged in the housing groove 60. It will be clear that said shoulder could be made as an integral part of the housing 59 thus eliminating the need for ring 49 and groove 60. Disc 56 is slidable in housing 59 and is limited in that sliding movement toward the right as viewed by the shoulder 52 created by the retaining ring 51 engaged in the housing groove 61. It will become clear that the disc 56 could be a flanged tubular part as shown in FIG. 5 which can be secured to the housing 59 by bolts 58. A further variation of the disc 54 or 56 in the present invention is shown as the tubular sleeve 117 of FIG. 3 as will be described in further detail. The actual manner in which the spacers 53 and 55 are deformed to their final axial dimension will be described in conjunction with FIGS. 3 and 4, however, it should first be noted that the assembly techniques associated with the differential axle of FIG. 1 may be employed on a wide variety of structures with the centrifugal pump of FIG. 2 illustrating one such structure.

Figure 2:
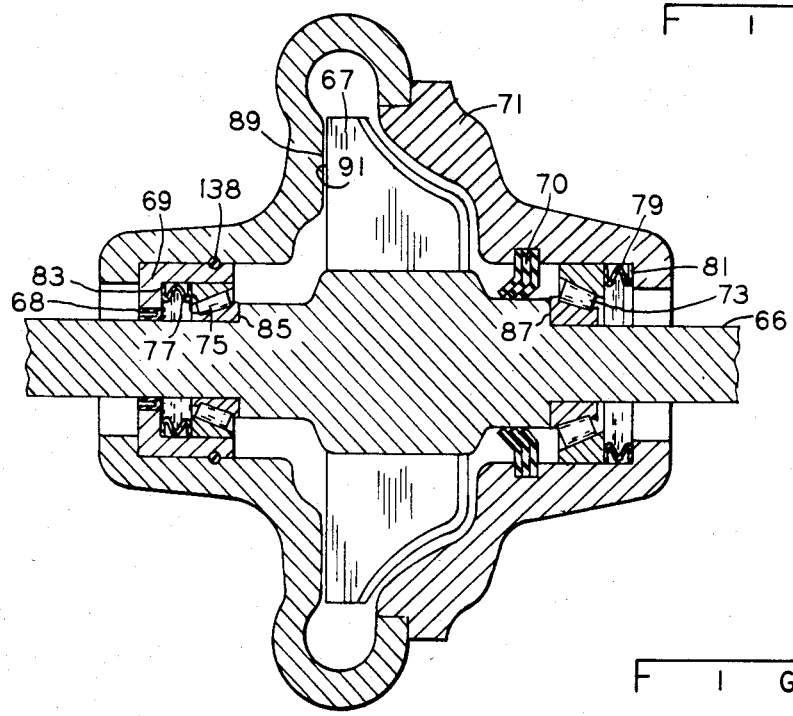
FIG. 2 is a view in cross section of a portion of a centrifugal pump assembled in accordance with the techniques of the present invention.

The centrifugal pump of FIG. 2 has shaft 66 including an impeller 67, seals 68, 138 and 70, and slidable sleeves 69 and 71, the latter of which is radially larger than the impeller 67 to facilitate assembly with the shaft 66 rotatably supported within the centrifugal pump housing by roller bearings 73 and 75 and deformable spacers 77 and 79. The bearings and abutting spacers are captive between shoulders 81 and 83 of the sleeves and 85 and 87 of the shaft. In such a pump it is highly desirable to have the separation between the housing face 89 and corresponding surface 91 of the impeller quite small and yet sufficient to allow rotation of the impeller within the housing. This separation constitutes a critical dimension within the centrifugal pump just as the backlash between ring gear 29 and pinion gear 31 in FIG. 1 constituted a critical dimension in that device. The techniques for accurately deforming spacers 77 and 79 in FIG. 2 may be the same as the techniques for accurately deforming the spacers 53 and 55 in FIG. 1 with those techniques being described in conjunction with a bevel gear device as illustrated in FIGS. 3 and 4.

Figure 3:
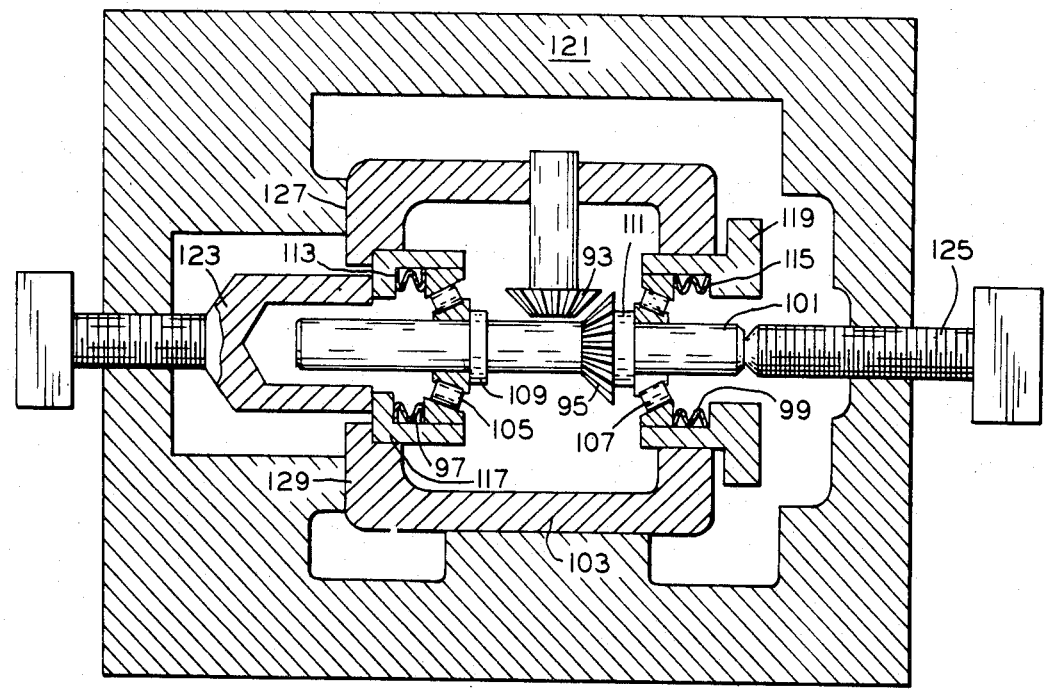
FIG. 3 illustrates an exemplary bevel gear device in a machine for deforming the spacing elements.

In FIG. 3, the meshing of bevel gears 93 and 95 constitutes a critical internal dimension for the device and is achieved by the proper deformation of deformable spacers 97 and 99. Like the above discussed devices, the bevel gear mechanism in FIG. 3 includes a rotatable member such as shaft 101 and a support or housing 103 with tapered roller bearings 105 and 107 captive between radial protrusions 109 and 111 on the shaft 101 and shoulders or abutments 113 and 115 on axially slidable sleeves 117 and 119.

The spacer deforming mechanism includes a press frame 121 and rams or pressing devices 123 and 125 illustrated as threaded members operating in a vise like manner although the rams 123 and 125 may be more sophisticated hydraulically actuated devices or similar structures to impose accurate displacement of the deformable spacers if desired.

The process of positioning shaft 101 within the support 103 may proceed as follows. The support 103 is positioned within the frame 121 so as to abut the surfaces at 127 and 129 and then member 125 is actuated to push shaft 101 to the left as viewed and into the correct axial position with the proper amount of backlash between the gears 93 and 95 and at the same time compressing the spacer 97 to its desired final axial dimension. An additional predetermined axial compression of the spacer 97 to compensate for the resilience of that spacer as well as any resilience of the bearing is achieved by moving member 123 toward the right as viewed so as to slide sleeve 117 by this predetermined axial amount. Rams 123 and 125 are then withdrawn somewhat and the support 103 turned end-for-end and repositioned within the press frame 121 as illustrated in FIG. 4. Since spacer 97 has been formed to its desired final dimension, further deformation of this spacer is now prevented by moving the ram 125 into abutment with the shaft 101 as illustrated in FIG. 4 while at the same time resting the support 103 against the press frame as at 131 and 133. Deformation of the spacer 99 to its desired ultimate dimension is now accomplished by moving the ram 123 toward the right as viewed in FIG. 4, forcing sleeve 119 to its desired final position with its annular flange abutting the support 103. Again, some additional deformation of the spacer 99 to compensate for the resilience of that spacer as well as any bearing resilience is imparted by moving ram 125 slightly toward the left as viewed in FIG. 4 through the predetermined distance required. Both spacers are now formed to their desired final dimensions and the backlash between gears 93 and 95 is at its preferred setting and the structure may be removed from the press frame for further processing.

While FIGS. 2 through 5 illustrate a support or housing where one of the discs is limited in movement toward the interior of the housing and the other limited in movement toward the housing exterior, the structure of FIG. 1 illustrates two such discs both limited in movement toward the housing exterior by the retaining rings received in the housing grooves. Also, while the differential assembly of FIG. 1 could have the shaft and ring gear portion accurately and quickly axially positioned within the support with the desired predetermined axial bearing clearance in the manner described in conjunction with FIGS. 3 and 4, this differential may also have the collapsible bearing spacers adjusted in a somewhat different manner since the additional predetermined axial compression of the spacers may be achieved by depressing or moving inwardly the movable shoulder elements 54 and 56.

Reducing the separate number of elements or pieces to be assembled in the manufacture of devices of the general type described frequently results in reduced assembly time and a resultant reduction in manufacturing costs. Several schemes for reducing the number of parts are illustrated as options throughout the several drawing views. Thus, for example, a differential assembly as illustrated in FIG. 1 may frequently be oil filled and require oil seals between the shaft 11 and housing 59. This may be achieved by providing an O-ring slot 136 between the housing 59 and disc 54 and forming an annular sealing surface 134 on the disc. Another way to reduce the number of parts to be assembled is to form the collapsible bearing spacer 55 of FIG. 1 integral with the movable shoulder 56 as, for example, by welding the elements together at 140. A further variation for reducing the number of elements would be to form the bearing spacer 55 integral with a portion of the bearing as illustrated in FIG. 5 where the spacer 55 is welded to the outer bearing race 47 at 142.

The inwardly movable shoulder such as 54, 56, 69, 71, 117 or 119 has variously been described as a disc, sleeve or shoulder with each term intended to encompass the others as well as functionally equivalent structures for adjusting the collapsible bearing spacers.

From the foregoing it is now apparent that a novel approach to the positioning and journalling of a shaft within a housing has been presented meeting the objects and advantageous features set out hereinbefore as well as others. It will be apparent that the shaft, sleeves, housing, scheme for retaining the sleeves within the housing and critical internal dimension may take a wide variety of forms and that virtually any type thrust carrying mechanical shaft support bearings or combination of radial and thrust bearings may be employed and that the rotating assembly may be of a wide variety of types for a wide variety of purposes and further that the pressing fixture may, for example, employ a pair of concentric means at each end so as to eliminate the workpiece reversal illustrated between FIGS. 3 and 4. These as well as other modifications as to the precise configurations, shapes and details may be made by those having ordinary skill in the art without departing from the spirit of the invention or the scope thereof as set out by the claims which follow.

What is claimed is:

1. An arrangement of thrust carrying bearings and deformable spacing elements rotatably supporting an axially extending shaft within a housing, the housing having an interior and an exterior, a critical dimension determining element within the housing interior, and a shaft portion which limits shaft movement in one axial direction, the arrangement including a pair of incompressible discs slidable in the housing and adjacent to the spacing elements with one of the discs being limited in sliding movement in said one axial direction towards the direction of the exterior of the housing and the other of the discs being limited in sliding movement toward the interior of the housing wherein each bearing is adjacent a corresponding spacing element with the spacing element, adjacent bearing and adjacent disc axially captive between the housing and the shaft.

2. The arrangement of claim 1 further comprising radially outwardly protruding shaft portions for limiting axially inward movement of the respective captive spacing elements and adjacent bearings.

3. The arrangement of claim 1 further comprising radially inwardly protruding disc portions for limiting axially outward movement of the respective captive spacing elements and adjacent bearings.

4. The arrangement of claim 1 wherein there are two discs, both limited in movement toward the housing exterior.

5. The arrangement of claim 1 wherein at least one spacing element and adjacent disc are formed together as one element.

6. The arrangement of claim 1 further comprising means associated with each spacing element forming a seal between the housing and the shaft.

7. The arrangement of claim 1 wherein at least two of the spacing element, adjacent bearing and adjacent disc are formed together as one element.

8. The arrangement of claim 1 with at least one of the deformable spacing elements having a movable shoulder formed integral therewith, the shoulder to be limited in outward movement in the housing and moved inwardly to form the spacing element to a desired final axial dimension.

* * * * *